(12) United States Patent
Takahashi

(10) Patent No.: US 7,885,559 B2
(45) Date of Patent: Feb. 8, 2011

(54) LIGHT AMOUNT MEASURING DEVICE, IMAGE FORMING APPARATUS, AND TONER DENSITY MEASURING APPARATUS

(75) Inventor: Osamu Takahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 698 days.

(21) Appl. No.: 11/846,912

(22) Filed: Aug. 29, 2007

(65) Prior Publication Data

US 2008/0056744 A1  Mar. 6, 2008

(30) Foreign Application Priority Data

Aug. 31, 2006  (JP) .............................. 2006-235729

(51) Int. Cl.
  *G03G 15/056*  (2006.01)
(52) U.S. Cl. .......................................... 399/49; 399/74
(58) Field of Classification Search .................. 399/74, 399/49; 347/111
  See application file for complete search history.

(56) References Cited

U.S. PATENT DOCUMENTS

| | | | |
|---|---|---|---|
| 3,343,450 A | | 9/1967 | Glaser et al. |
| 4,279,498 A | * | 7/1981 | Eda et al. ..................... 399/58 |
| 4,648,702 A | | 3/1987 | Goto |
| 5,266,997 A | * | 11/1993 | Nakane et al. ................ 399/49 |
| 5,365,313 A | | 11/1994 | Nagamochi et al. |
| 5,678,132 A | | 10/1997 | Shiba et al. |
| 5,732,308 A | * | 3/1998 | Miura ......................... 399/32 |
| 2003/0038332 A1 | | 2/2003 | Kimura |
| 2005/0163519 A1 | * | 7/2005 | Takahashi ..................... 399/49 |
| 2006/0159477 A1 | | 7/2006 | Tomita et al. |

FOREIGN PATENT DOCUMENTS

| | | |
|---|---|---|
| JP | 03059686 | 3/1991 |
| JP | 04-129331 | 4/1992 |
| JP | 04347870 | 12/1992 |
| JP | 04347871 | 12/1992 |
| JP | 06109643 | 4/1994 |
| JP | 06-077344 | 10/1994 |
| JP | 06317524 | 11/1994 |

(Continued)

OTHER PUBLICATIONS

Japanese Office Action for Application No. 2006-235729, Mailing Date: Jul. 17, 2008.

*Primary Examiner*—David P Porta
*Assistant Examiner*—Yara B Green
(74) *Attorney, Agent, or Firm*—Banner & Witcoff, Ltd

(57) ABSTRACT

A light amount measuring device, according to the present invention can include, a light-receiving sensor capable of outputting a voltage corresponding to an amount of incident light, an A/D converting portion capable of converting an input voltage into a digital value, a light amount calculating portion capable of calculating the amount of light incident on the light-receiving sensor on the basis of the digital value obtained by conversion by the A/D converting portion, a resistor connected between the A/D converting portion and the light-receiving sensor, a zener diode has one end connected between the A/D converting portion and the resistor, wherein the zener diode is capable of allowing a breakdown current flow from the one end to another end if an output voltage from the light-receiving sensor is not less than a predetermined value.

15 Claims, 11 Drawing Sheets

FOREIGN PATENT DOCUMENTS

| | | |
|---|---|---|
| JP | 07160070 | 6/1995 |
| JP | 08015930 | 1/1996 |
| JP | 08023445 | 1/1996 |
| JP | 10-218431 | 8/1998 |
| JP | 2000-039746 | 2/2000 |
| JP | 2000-258471 | 9/2000 |
| JP | 2006145679 | 6/2006 |

* cited by examiner

LIGHT AMOUNT MEASURING DEVICE, IMAGE FORMING APPARATUS, AND TONER DENSITY MEASURING APPARATUS

CROSS REFERENCE TO RELATED APPLICATION

This application claims priority from Japanese Patent Application No. 2006-235729 filed Aug. 31, 2006. The entire content of this priority application is incorporated herein by reference.

TECHNICAL FIELD

The disclosure relates to a light amount measuring device, an image forming apparatus, and a toner density measuring apparatus.

BACKGROUND

In the field of image forming apparatuses, a technique for inputting an output voltage from a light-receiving sensor to an A/D converter for digitization and using the resultant for various types of control has been done.

When a voltage output from the light-receiving sensor (an output voltage) is to be input to the A/D converter through a predetermined path, it is desirable for accurate and efficient detection of the amount of light received by the light-receiving sensor so that a voltage input to the A/D converter (an input voltage) falls within an allowable range specific to the A/D converter and that the domain of the input voltage extends over the entire allowable range (i.e., the entire allowable range be effectively used).

However, it is difficult to configure the light-receiving sensor or a circuit peripheral thereto such that the domain of the input voltage extends over the entire allowable range of the A/D converter (i.e., the maximum value of the input voltage barely falls within the allowable range).

For example, voltages output by light-receiving sensors vary due to various factors such as individual differences among the light-receiving sensors themselves and individual differences among members, each of which is in the path of light emitted from a light-emitting portion to the corresponding light-receiving sensor. Accordingly, if the maximum output of the light-receiving sensor, the circuit constant of the peripheral circuit, and the like are set in consideration of such variation, the maximum value of the input voltage becomes considerably lower on average than the upper end of the allowable range. This makes it impossible to effectively use the entire allowable range of the A/D converter. On the other hand, if the light-receiving sensor or peripheral circuit is configured without taking such variation into consideration, the input voltage may fall outside the allowable range. In this case, part of the input voltage outside the allowable range cannot be used for light amount measurement.

The input range is likely to fall outside the allowable range not only due to the problem of variation but also due to circumstances where the maximum output of the light-receiving sensor needs to be increased or circumstances where the upper end of the allowable range of the A/D converter needs to be lowered. In this case as well, part of the input voltage cannot be effectively used for light amount measurement.

Thus, there is a need in the art for a light amount measuring device, image forming apparatus, and toner density measuring apparatus, capable of converting an output voltage from a light-receiving sensor appropriately and keeping the domain of an input voltage input to an A/D converter within the allowable range of the A/D converter easily.

SUMMARY

A light amount measuring device, according to the present invention can include, a light-receiving sensor capable of outputting a voltage corresponding to an amount of incident light, an A/D converting portion capable of converting an input voltage into a digital value, a light amount calculating portion capable of calculating the amount of light incident on the light-receiving sensor on the basis of the digital value obtained by conversion by the A/D converting portion, a resistor connected between the A/D converting portion and the light-receiving sensor, a zener diode has one end connected between the A/D converting portion and the resistor, wherein the zener diode is capable of allowing a breakdown current flow from the one end to another end if an output voltage from the light-receiving sensor is not less than a predetermined value.

BRIEF DESCRIPTION OF THE DRAWINGS

Illustrative aspects in accordance with the invention will be described in detail with reference to the following figures wherein.

DETAILED DESCRIPTION OF THE PREFERRED ILLUSTRATIVE ASPECTS

An illustrative aspect of the present invention will be described with reference to the figures.

1. Overall Configuration of Image Forming Apparatus

Figure 1:
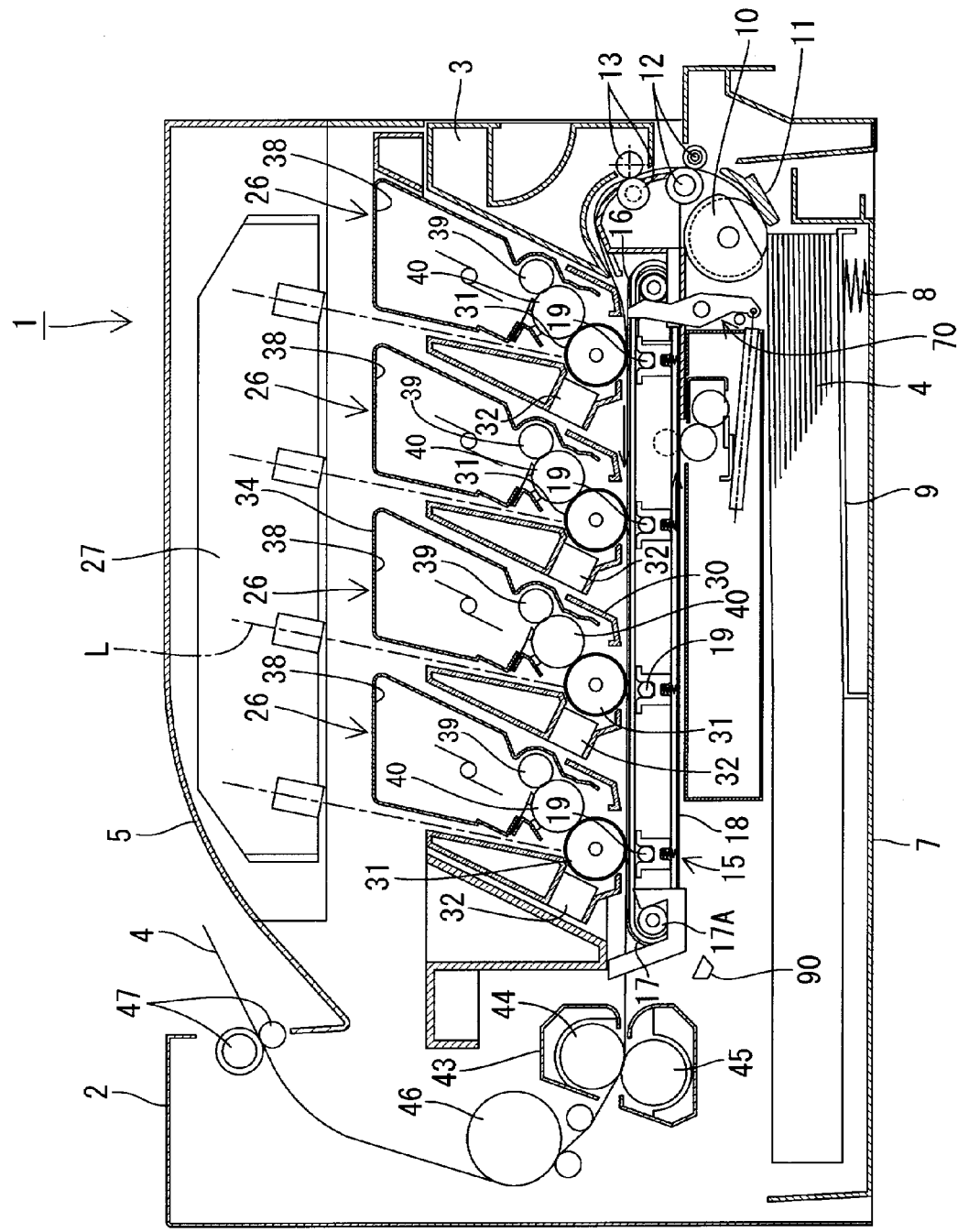
FIG. 1 is a schematic sectional side view illustrating an image forming apparatus according to an illustrative aspect of the invention.

FIG. 1 is a schematic fragmentary sectional view showing the schematic configuration of an image forming apparatus 1 of the present illustrative aspect. In the following description, the right side of FIG. 1 will be referred to as the front side of the image forming apparatus 1. The image forming apparatus 1 can be a laser printer, or more specifically can be a direct transfer tandem type color laser printer. The image forming apparatus includes an almost box-shaped main body casing 2, as shown in FIG. 1. The main body casing 2 has a front cover 3 provided on its front surface which can be opened or closed, a discharge tray 5 formed on its top surface on which recording mediums 4 (such as a paper sheet, plastic sheet, or the like) after image formation are stacked, and a feed tray 7 mounted at a lower portion thereof on which the recording mediums 4 for image formation are stacked.

When the top one of the recording mediums 4 on the feed tray 7 is positioned between a pickup roller 10 and a separation pad 11 by rotation of the pickup roller 10, it is separated from the others. The recording medium 4, fed from between the pickup roller 10 and the separation pad 11, is delivered to registration rollers 13 by feed rollers 12. The registration rollers 13 feed the recording medium 4 onto a belt unit 15 in the rear thereof at a predetermined timing.

The belt unit 15 includes a conveyor belt 18 which is horizontally stretched between a pair of support rollers 16 and 17 spaced apart from each other in the front-to-rear direction. Of the pair of support rollers 16 and 17, the rear support roller 17 is a driving roller which is rotatively driven by power from a motor (not shown) while the front support roller 16 is a tension roller (driven roller) for applying tension to the conveyor belt 18, as will be described later. The conveyor belt 18, which can be a belt composed of a resin material such as polycarbonate, conveys each recording medium 4 put on its upper surface rearward. Inside the conveyor belt 18, a plurality of transfer rollers 19 which are arranged to oppose photosensitive drums 31 (which will be described later) are provided side by side at regular intervals in the front-to-rear direction.

Above the belt unit 15, a plurality of process cartridges 26 corresponding to various colors (such as magenta, yellow, cyan, and black) are detachably mounted side by side in the front-to-rear direction. Above the process cartridges 26 is provided a scanner portion 27. The scanner portion 27 irradiates the surfaces of the photosensitive drums 31 with laser light beams L of the corresponding colors modulated based on predetermined image data at the time of rapid scanning.

Each process cartridge 26 (an example of a forming portion) includes a cartridge frame 30, the photosensitive drum 31 and a charging device 32 which are provided below the cartridge frame 30, and a development cartridge 34 which is detachably mounted to the cartridge frame 30. Each development cartridge 34 has, in its inside, a toner containing chamber 38 containing toner. The toner containing chamber 38 has a supply roller 39, a developing roller 40, and the like provided therein.

A fixing device 43 heats each recording medium 4 carrying toner images while conveying the recording medium 4 positioned between a heat roller 44 and a pressure roller 45, thereby fixing the toner images on the recording medium 4. The recording medium 4 (after the heat fixing) is conveyed to discharge rollers 47 which are provided at an upper portion of the main body casing 2 by a conveyor roller 46 which is arranged diagonally above and in the rear of the fixing device 43. The recording medium 4 is discharged onto the above-described discharge tray 5 by the discharge rollers 47.

2. Electrical Configuration

Figure 2:
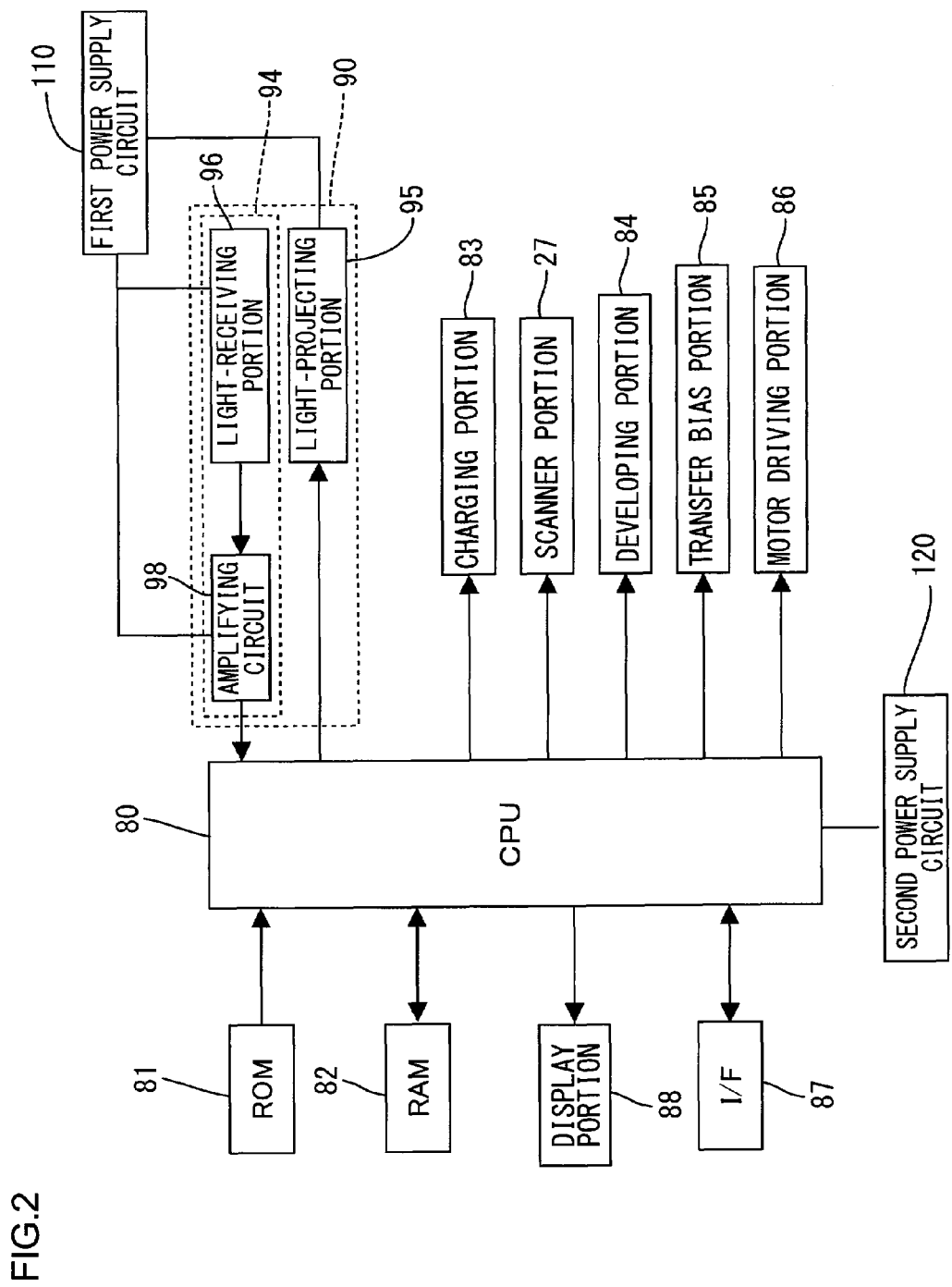
FIG. 2 is a block diagram illustrating the electrical configuration of the image forming apparatus in FIG. 1.

FIG. 2 is a block diagram of a control system of the image forming apparatus 1. As shown in FIG. 2, the image forming apparatus 1 has a CPU 80 provided therein which controls many aspects of the apparatus 1. Connected to the CPU 80 are a ROM 81 (an example of a storage portion) storing an operation program and the like and a RAM 82 for storing image data used for print processing and the like. The CPU 80 controls a charging portion 83 which drives the above-described charging devices 32, the scanner portion 27, a developing portion 84 which drives the development cartridges 34, and a transfer bias portion 85 for transferring toner images on the photosensitive drums 31 onto the recording medium 4. The CPU 80 also controls a motor driving portion 86 which drives a drum motor serving as the driving source of the photosensitive drums 31 and a drive motor of the support roller 17, which runs the conveyor belt 18.

The CPU 80 is connected to a communication terminal (not shown) such as a personal computer through an interface 87. The image forming apparatus 1 drives and controls the scanner portion 27 and the like on the basis of image data input from the communication terminal. The CPU 80 is also connected to a display portion 88 which is composed of an LCD (Liquid crystal display) or the like.

The CPU 80 is further connected to a density sensor 90. The density sensor 90 includes a light-projecting portion 95 and a light-receiving sensor 94 which is composed of a light-receiving portion 96 and an amplifying circuit 98. A signal from the light-receiving sensor 94 is input to the CPU 80. Note that the specific configuration of the density sensor 90 will be described later.

The image forming apparatus 1 also has a first power supply circuit 110 and a second power supply circuit 120 provided therein. The first power supply circuit 110 corresponds to an example of a first power supply. The first power supply circuit 110 is configured as a known constant-voltage circuit and configured to apply a voltage V1 to the density sensor 90. The second power supply circuit 120 corresponds to an example of a second power supply. The second power supply circuit 120 is configured as a known constant-voltage circuit and configured to apply a voltage V2 to the CPU 80. In the present illustrative aspect, the second applied voltage V2 from the second power supply circuit 120 to the CPU 80 is set to be lower than the first applied voltage V1 from the first power supply circuit 110 to the density sensor 90.

Note that the CPU 80 corresponds to an example of an A/D converting portion, an example of a light amount calculating portion, and an example of a regulating portion.

3. Density Sensor and Peripheral Circuit

Figure 3:
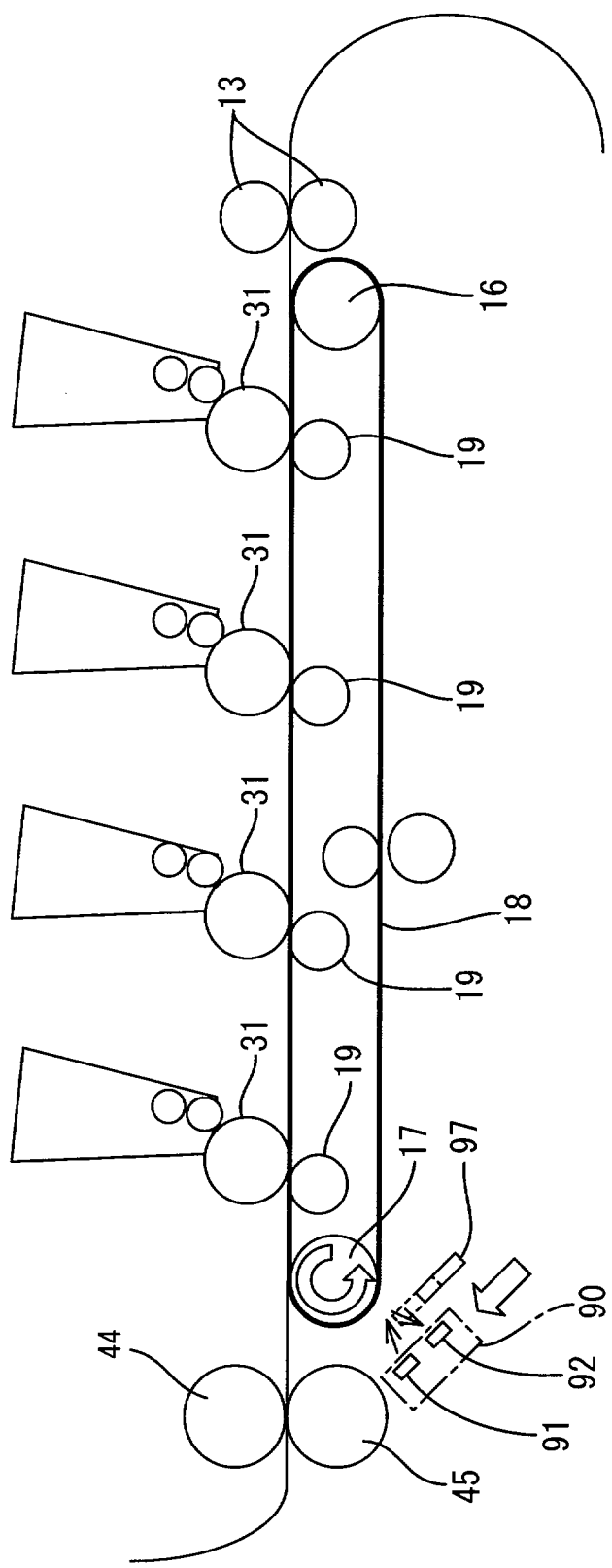
FIG. 3 is an explanatory view for schematically explaining an illustrative aspect of detection by a density sensor.
Figure 4:
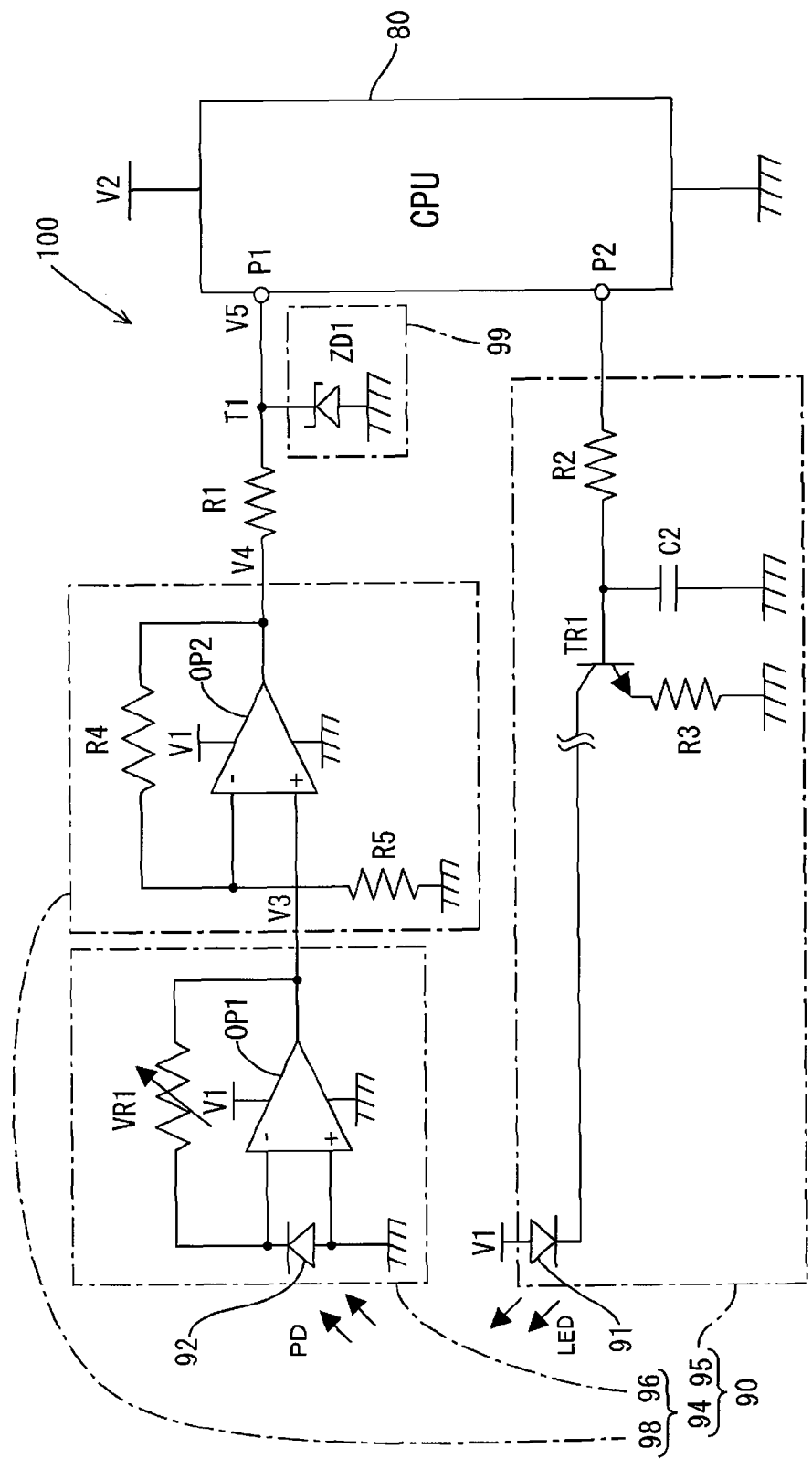
FIG. 4 is a circuit diagram schematically illustrating the configuration of connection among the density sensor, a current regulating circuit, and a CPU.
Figure 5:
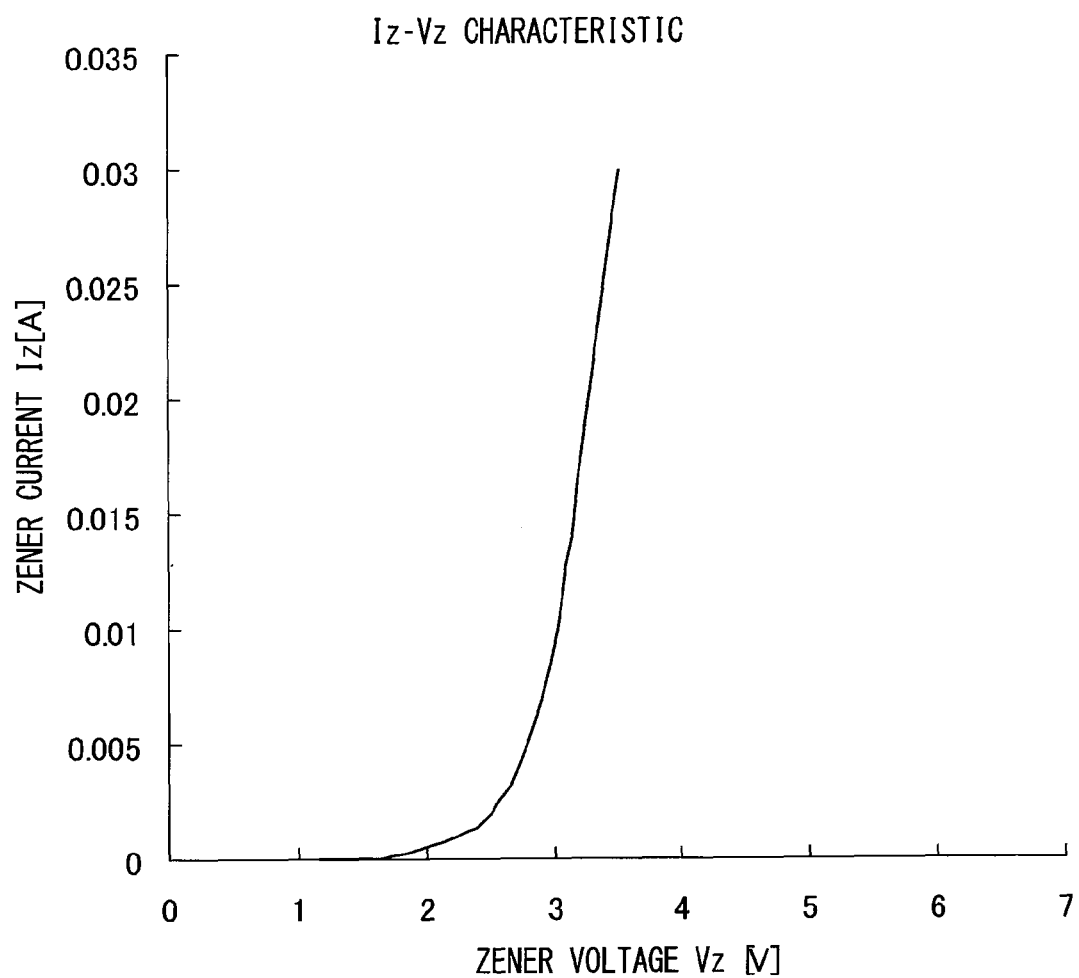
FIG. 5 is a graph illustrating the Iz-Vz characteristic of a zener diode used in a light amount measuring device.
Figure 6:
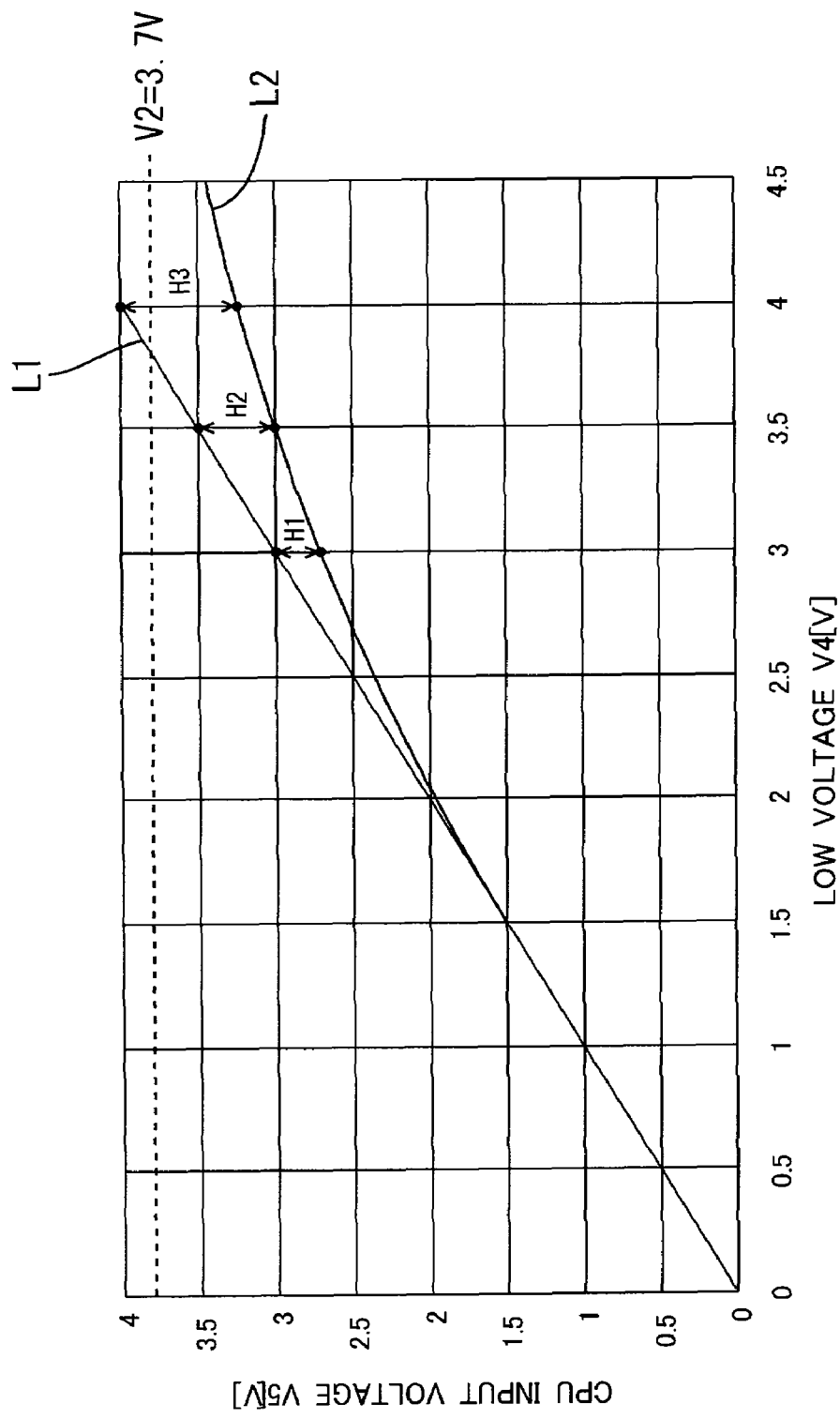
FIG. 6 is a graph showing the correspondence between an output voltage from a light-receiving sensor and an input voltage to the CPU.

The density sensor 90 and a circuit peripheral thereto will now be described in detail. FIG. 3 is an explanatory view for schematically explaining an illustrative aspect of detection by the density sensor 90. FIG. 4 is a circuit diagram schematically illustrating the configuration of connection among the density sensor 90, a current regulating circuit 99, and the CPU 80. FIG. 5 is a graph showing the Iz-Vz characteristic of a zener diode used in a light amount measuring device 100 of the present illustrative aspect. FIG. 6 is a graph showing the relationship between an output voltage V4 from the light-receiving sensor 94 and an input voltage V5 to the CPU 80 (the relationship between a characteristic curve L1 indicating the output voltage V4 and a characteristic curve L2 indicating the input voltage V5).

As shown in FIGS. 1 and 2, in the image forming apparatus 1 according to the present illustrative aspect, the above-described density sensor 90 is provided to detect the density of an image, a base of the conveyor belt 18, or the like. As shown in FIGS. 3 and 4, the density sensor 90 has a light-emitting element 91 provided in the light-projecting portion 95 which is composed of an infrared LED and a light-receiving element 92 provided in the light-receiving portion 96 which is composed of a photodiode. The density sensor 90 is configured as a reflection photosensor.

As shown in FIG. 3, the density sensor 90 is arranged diagonally below and in the rear of the belt unit 15. In the density sensor 90, the light-emitting element 91 is tilted with respect to the surface of the conveyor belt 18, and the light-receiving element 92 is positioned to receive specularly reflected light emitted from the light-emitting element 91 and reflected from the conveyor belt 18.

Between the light-receiving element 92 and the conveyor belt 18 is provided a shiftable shutter 97. The shutter 97 is driven by an actuator (a solenoid, a motor, or the like) which is controlled by the CPU 80. The shutter 97 is configured to shift between a shielding position (a position indicated by the broken line in FIG. 3) and a retracted position (a position indicated by the solid line in FIG. 3). When the shutter 97 is at the shielding position, it shields the light-receiving element 92 from reflected light. On the other hand, when the shutter 97 retracts from the shielding position and shifts to the retracted position, the light-receiving element 92 can receive reflected light.

As shown in FIG. 4, the light-projecting portion 95 is composed of the above-described light-emitting element 91 and a driving circuit which drives the light-emitting element 91. The driving circuit includes a transistor TR1 having a collector terminal connected to one end of the light-emitting element 91 and a resistor R2 having one end connected to a terminal P2 of the CPU 80 and the other end connected to a base terminal of the transistor TR1. An emitter terminal of the transistor TR1 is connected to a ground line through a resistor R3. A capacitor C2 has one end connected between the resistor R2 and the base terminal of the transistor TR1 and the other end grounded. The light-emitting element 91 is connected to the first power supply circuit 110 on the side of an anode thereof and to the collector terminal of the transistor TR1 on the side of a cathode thereof. The light-projecting portion 95 smoothes a PWM signal output from the terminal P2 of the CPU 80 by the resistor R2 and capacitor C2. The resultant smoothed analog level is supplied to the transistor TR1. The transistor TR1 is driven, which causes a current corresponding to the smoothed analog level to flow to the light-emitting element 91. The light-emitting element 91 irradiates the conveyor belt 18 with light.

The light-receiving portion 96 is configured to include the above-described light-receiving element 92 and a current-to-voltage converting portion which converts a current flowing through the light-receiving element 92 into a voltage signal. The current-to-voltage converting portion is realized by an operational amplifier OP1 and a variable resistor VR1. More specifically, the light-receiving element 92 (composed of the photodiode) has one end connected to an inverting input terminal (negative terminal) of the operational amplifier OP1 and the other terminal connected to a non-inverting input terminal (positive terminal) of the operational amplifier OP1. The variable resistor VR1 configured as a feedback resistor has one end connected to an output terminal of the operational amplifier OP1 and the other end connected to the inverting input terminal. In the current-to-voltage converting portion, an output V3 is determined by the value of a current which flows through the light-receiving element 92 according to the amount of light incident on the light-receiving element 92 and the resistance of the variable resistor VR1.

The amplifying circuit 98 is configured to output the output voltage V4 obtained by amplifying the output V3 from the light-receiving portion 96. The output voltage V4 corresponds to an example of an "output voltage from a light-receiving sensor." The amplifying circuit 98 is configured as a known non-inverting amplifying circuit using an operational amplifier OP2. The output V3 from the light-receiving portion 96 is input to a non-inverting input terminal of the operational amplifier OP2. A resistor R4 is connected between an output terminal and an inverting input terminal of the operational amplifier OP2. One end of resistor R5 is connected to a contact point between the resistor R4 and the inverting input terminal. The other end of the resistor R5 is grounded.

One end of resistor R1 is connected to an output terminal of the amplifying circuit 98. The other end of the resistor R1 is connected to an input terminal P1 of the CPU 80. The resistor R1 corresponds to an example of a "resistor connected between an A/D converting portion and a light-receiving sensor."

The light amount measuring device 100 according to the present illustrative aspect has a current regulating circuit 99 corresponding to an example of a lowering portion. The current regulating circuit 99 has a function of lowering a tendency for the input voltage (to the CPU 80) to increase with an increase in the amount of light incident on the light-receiving portion 96 if the output voltage V4 from the amplifying circuit 98 is not less than a predetermined value. More specifically, the current regulating circuit 99 has one end connected between the CPU 80 and the resistor R1 and functions to increase the amount of current drawn in through the one end if the output voltage V4 is not less than the predetermined value. That is, if the output voltage V4 from the amplifying circuit 98 exceeds the predetermined value, an internal current flowing from a connection point T1 into the current regulating circuit 99 increases with the magnitude of the output voltage V4. Accordingly, a current flowing through the resistor R1 also increases with the output voltage V4, and a voltage drop occurs across the resistor R1 corresponding to the magnitude of the output voltage V4.

In the present illustrative aspect, the current regulating circuit 99 is realized by a zener diode ZD1. The zener diode ZD1 has one end connected between the CPU 80 and the resistor R1 and the other end grounded. The zener diode ZD1 functions to let a breakdown current flow from the one end to the other end if the output voltage V4 from the amplifying circuit 98 (the voltage applied to the resistor R1) is not less than the predetermined value.

A breakdown current flowing through the zener diode ZD1 is mainly composed of a current caused by a tunnel effect. That is, a zener breakdown resulting from a tunnel effect is dominant in the zener diode ZD1. As illustrated in the graph of the Iz-Vz characteristic in FIG. 5, $\Delta Iz/\Delta Vz$ gradually changes near a breakdown voltage.

With the above-described configuration, the relationship as shown in FIG. 6 is consistent with the light amount measuring device 100 of the present illustrative aspect. More specifically, if the output voltage V4 from the amplifying circuit 98 is not more than the predetermined value (about 2.0 V), the output voltage V4 is almost equal to the input voltage V5 to the CPU 80. On the other hand, if the output voltage V4 exceeds the predetermined value (about 2.0 V), a breakdown current starts flowing through the zener diode ZD1. The predetermined value is set to be lower than the second applied voltage V2 from the second power supply circuit 120. If the output voltage V4 exceeds the predetermined value, lowering is performed such that the input voltage V5 falls within the allowable range of the CPU 80.

With such a configuration, even if the output voltage V4 exceeds the second applied voltage V2 to the CPU 80, lowering is performed according to the magnitude of the output voltage V4, and the input voltage V5 falls within the allowable range of the CPU 80 (in the present illustrative aspect, not more than 3.7 V) while appropriately reflecting the output voltage V4. Note that in the present illustrative aspect, the amount by which the input voltage V5 is made lower than the output voltage V4 from the light-receiving sensor 94 (hereinafter referred to as a lowered amount) increases (i.e., a voltage drop across the resistor R1 increases) with an increase in the output voltage V4 in a certain voltage region where the output voltage V4 exceeds the predetermined value, as shown in FIG. 6. For example, a lowered amount H2 when the output voltage V4 is 3.5 V is larger than a lowered amount H1 when the output voltage V4 is 3V, and a lowered amount H3 when the output voltage V4 is 4V is even larger.

Figure 7:
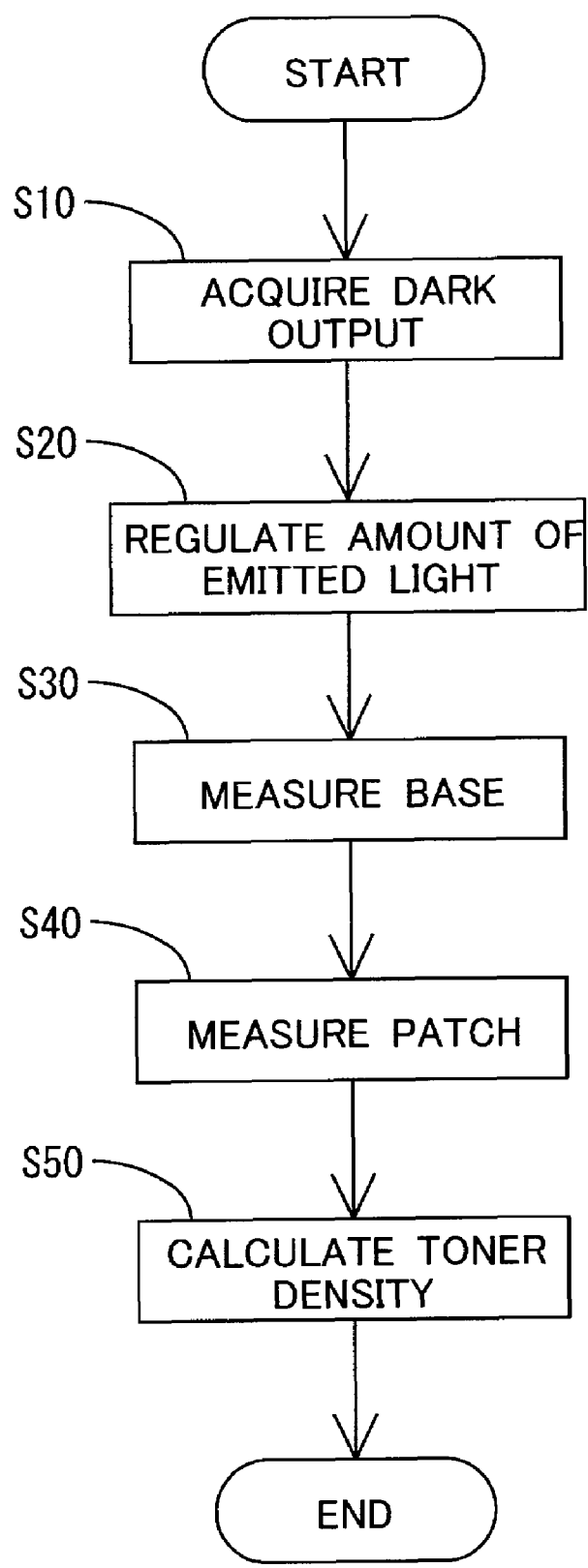
FIG. 7 is a flow chart illustrating the flow of density measurement.

Density measurement using the above-described light amount measuring device 100 will now be described. FIG. 7 is a flow chart illustrating the flow of the density measurement.

First, a dark output Vda from the light-receiving sensor 94 is acquired (S10). The dark output Vda is an output voltage from the light-receiving sensor 94 (i.e., the output voltage V4 from the amplifying circuit 98) when the light-receiving element 92 is shielded by the shutter 97, as indicated by the broken line in FIG. 3, and the light-emitting element 91 is not emitting light. The dark output Vda is a voltage used as a reference at the time of light amount measurement. In light amount measurement of the present illustrative aspect, the amount of light is calculated on the basis of the amount of change in voltage from the dark output Vda.

The amount of light emitted from the light-emitting element 91 is then regulated (S20). In the present illustrative aspect, the CPU 80 PWM-controls an output signal from the output terminal P2, thereby regulating the amount of light emitted from the light-emitting element 91.

After that, the base of the conveyor belt 18 is measured (S30). More specifically, the base of the conveyor belt 18 having no toner image formed thereon is irradiated with light by the light-emitting element 91 provided in the light-projecting portion 95, and the amount of light reflected from the base is measured. In the measurement of the amount of reflected light, the light reflected from the base is received by the light-receiving portion 96, as described above, and the output V3 from the light-receiving portion 96 is amplified by the amplifying circuit 98 and output. At this time, if the output voltage V4 from the amplifying circuit 98 is not less than the predetermined value, the voltage input to the CPU 80 is lowered, as described above, and the CPU 80 acquires the lowered input voltage V5. If the voltage is not lowered, the input voltage V5 is almost equal to the output voltage V4.

In the image forming apparatus 1, correction information based on a characteristic of how the input voltage to the CPU 80 is lowered by the zener diode ZD1 is stored in the ROM 81. The correction information is information having values for the output voltage V4 and values for the input voltage V5 associated in advance according to the circuit characteristics of the light amount measuring device 100. The correction information is composed of a table having values for the output voltage V4 and values for the input voltage V5 associated with each other or an approximate expression by which the output voltage V4 can be calculated on the basis of the input voltage V5 or the like. The CPU 80 calculates the amount of light on the basis of a digital value into which the voltage lowered by the zener diode ZD1 is converted (i.e., a value obtained by digitizing the voltage V5) and the correction information stored in the ROM 81. More specifically, if the input voltage V5 is determined, the corresponding output voltage V4 is determined by referring to the correction information. In the base measurement in S30, the CPU 80 obtains a corrected voltage Vb by converting the input voltage V5 at the time of the base measurement into a digital value and performing a correction computation on the digital value (i.e., a value corresponding to the output voltage V4 at the time of the base measurement) and calculates the amount of change in voltage from the dark output Vda, Vb-Vda as the amount of light. Note that since the input voltage V5 is almost equal to the output voltage V4 if the output voltage V4 is not more than the predetermined value, as shown in FIG. 6, correction is not performed in this case.

Density patch measurement is performed next (S40). More specifically, the process cartridges 26, each corresponding to an example of the forming portion, form density patches (each corresponding to an example of a toner image) of the respective colors on the conveyor belt 18, and the light-emitting element 91 provided in the light-projecting portion 95 (corresponding to an example of an irradiating portion) irradiates each density patch with light. Light reflected from the density patch is received by the light-receiving portion 96, and the output V3 from the light-receiving portion 96 is amplified by the amplifying circuit 98. At this time, if the output voltage V4 from the amplifying circuit 98 is not less than the predetermined value, the above-described lowering is performed, and a lowered voltage is input to the CPU 80. In the density patch measurement, the CPU 80 obtains a corrected voltage Vp by converting the input voltage V5 at the time of the density patch measurement into a digital value and performing a correction computation on the digital value (i.e., a value corresponding to the output voltage V4 at the time of the density patch measurement) and calculates the amount of change in voltage from the dark output Vda, Vp-Vda as the amount of light, as in the base measurement.

Toner density calculation is performed next (S50). The conveyor belt 18 used in the present example is characterized in that it has a surface with a high gloss and thus a more intense specularly reflected light is obtained from the conveyor belt 18. If a toner image is formed, the surface of the conveyor belt is covered with toner, and specularly reflected light is attenuated. A toner density is obtained by taking advantage of this property. First, the ratio of the amount of light (Vp-Vda) at the time of the density patch measurement to the amount of light (Vb-Vda) at the time of the base measurement (hereinafter referred to as a base ratio), (Vp-Vda)/(Vb-Vda) is obtained. Such a base ratio corresponds one-to-one to a toner density. In the present illustrative aspect, data base ratio and toner density are associated with each other for each of the colors by base ratio/density correspondence information stored in the ROM 81. The base ratio/density correspondence information is information which associates a base ratio with a toner density corresponding to the base ratio by using a table or an approximate expression. If a base ratio is determined by the above-described computation, the toner density of a density patch to be detected is calculated by performing a computation while referring to the base ratio/density correspondence information.

A toner density detected in this manner is used for density regulation in print processing. For example, the CPU 80 controls driving of each of the above-described charging portion 83, scanner portion 27, developing portion 84, and transfer bias portion 85 on the basis of a toner density described above such that an image with a density appropriately reflecting print data is formed in print processing. In the present illustrative aspect, the CPU 80 corresponds to an example of a regulating portion.

As described above, according to the invention of the present illustrative aspect, if the output voltage from the light-receiving sensor 94 (the output voltage V4 from the amplifying circuit 98) is not less than the predetermined value, the amount of current drawn into the current regulating circuit 99 as the lowering portion increases. This increases the amount of current flowing to the one end of the current regulating circuit 99 through the resistor R1. In other words, if the output voltage V4 exceeds the predetermined value, a voltage drop occurs across the resistor R1, which lowers the voltage input to the CPU 80. Accordingly, it is possible to ensure a wide range as the output voltage range of the light-receiving sensor 94 which can be effectively used for light amount measurement.

The lowering portion is mainly composed of the zener diode ZD1. This makes it possible to realize a configuration which ensures a large voltage drop across the resistor R1 if the output voltage V4 is not less than the predetermined value, without any complicated configuration, and thus to easily and suitably lower the voltage input to the CPU 80.

The correction information based on the characteristic of how the input voltage to the CPU 80 is lowered by the zener diode ZD1 is stored in the ROM 81. The amount of light is calculated on the basis of a digital value into which a voltage lowered by the zener diode ZD1 is converted and the correction information. Thus, even if the voltage input to the CPU 80 has been lowered, the amount of light can be estimated with high accuracy on the basis of the lowered input voltage V5.

The zener diode ZD1 lets a breakdown current which is mainly composed of a current caused by a tunnel effect flow therethrough. A breakdown current, which is mainly composed of a current caused by a tunnel effect refers to a breakdown current in which a current caused by a tunnel effect is larger in amount than a current caused by an avalanche effect. For this reason, in a voltage region near a breakdown voltage, a voltage largely changes with a change in the amount of current. Thus, it is possible to gradually increase the degree of lowering with an increase in output voltage and suitably lower the voltage input to the CPU 80.

A configuration is realized in which the supplied voltage to the CPU 80 (the second applied voltage V2) is set to be lower than the supplied voltage to the light-receiving sensor 94 (the first applied voltage V1), and a voltage which exceeds the second applied voltage V2 is output from the light-receiving sensor 94. The output voltage can be effectively used for light amount measurement without any waste.

Since the predetermined value serving as a threshold of breakdown current generation is set to be lower than the second applied voltage V2, it is possible to suitably extend the output voltage range of the light-receiving sensor 94, which can be effectively used for light amount measurement.

The lowering action of the above-described zener diode is particularly effective in detecting the density of a black toner image. More specifically, since a change in the amount of reflected light with a change in density is smaller in a high density region (such as in a black toner image) than in a low density region, a high density region requires higher accuracy in light amount detection. Conversely, since a change in the amount of reflected light with a change in density is larger in a low density region than in a high density region, the accuracy can be made slightly lower in a low density region than in a high density region. Thus, the configuration (such as in the present illustrative aspect) achieves a desired effect.

Figure 10:
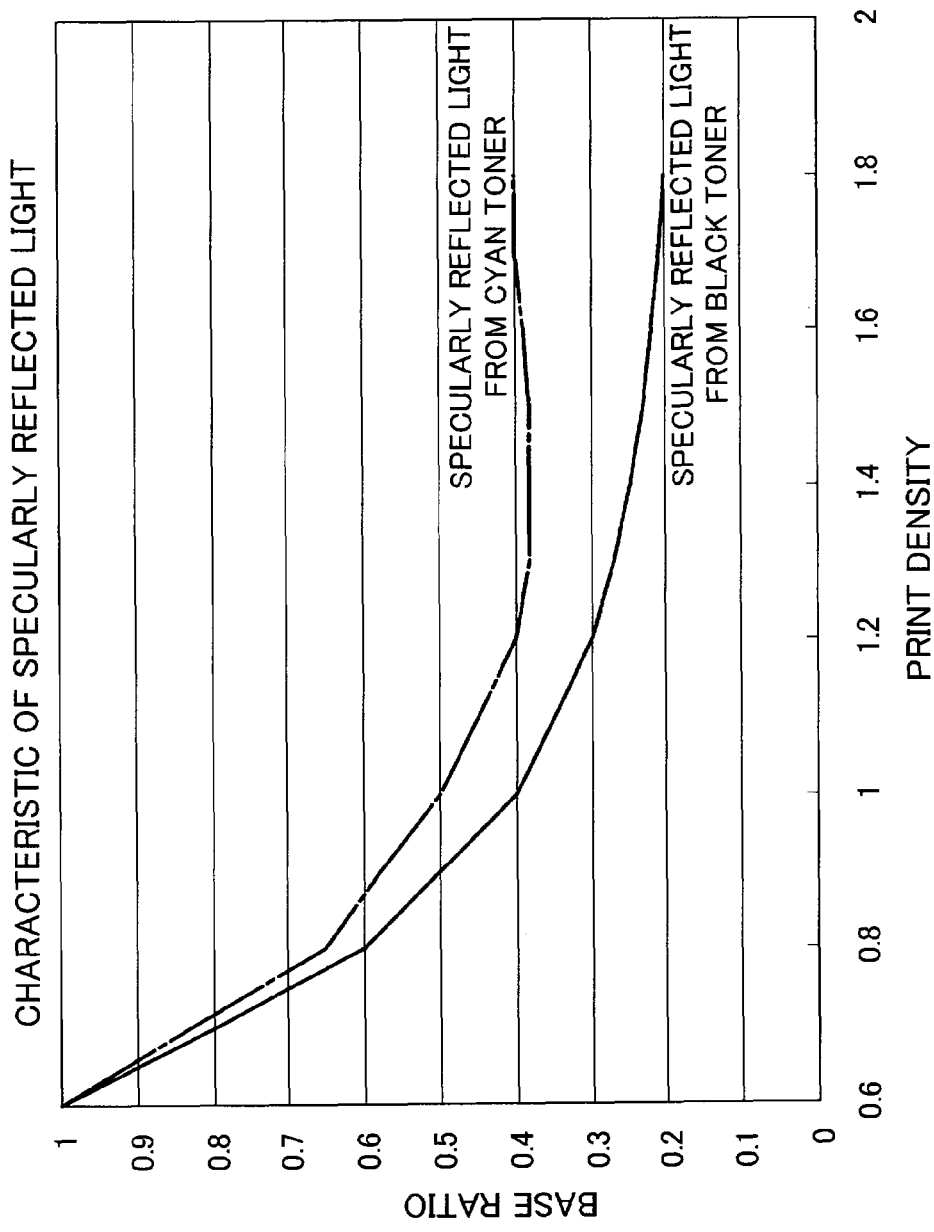
FIG. 10 is a graph illustrating the characteristics of specularly reflected light beams.

In a region with a high black toner density, since the density largely changes with a change in base ratio (see also the graph in FIG. 10), it is desirable to increase resolution and be capable of detecting even a slight change in base ratio with high accuracy (i.e., it is desirable to be capable of detecting even a slight change in the amount of reflected light with high accuracy). On the other hand, in a region with a low black toner density, since the density does not largely change with a change in base ratio, appropriate density detection can be performed even if the accuracy in detecting a base ratio is lowered to some degree (i.e., the accuracy in detecting the amount of reflected light is lowered to some degree).

In the present illustrative aspect, with a focus on the above-described property, lowering of the input voltage to the CPU 80 is not performed in a high density region where a change in the amount of reflected light with a change in density is small (i.e., a change in the output voltage V4 with a change in density is small). Accordingly, in a high density region, high-accuracy light amount detection at increased resolution can be performed. On the other hand, the input voltage to the CPU 80 is lowered in a low density region where a change in the amount of reflected light with a change in density is relatively large (i.e., a change in the output voltage V4 with a change in density is relatively large). Accordingly, a wide range can be ensured as the output voltage range of the light-receiving sensor 94, which can be effectively used for light amount measurement. Since such voltage lowering is realized only in a low density region, the detection accuracy can be appropriately maintained.

Figure 8:
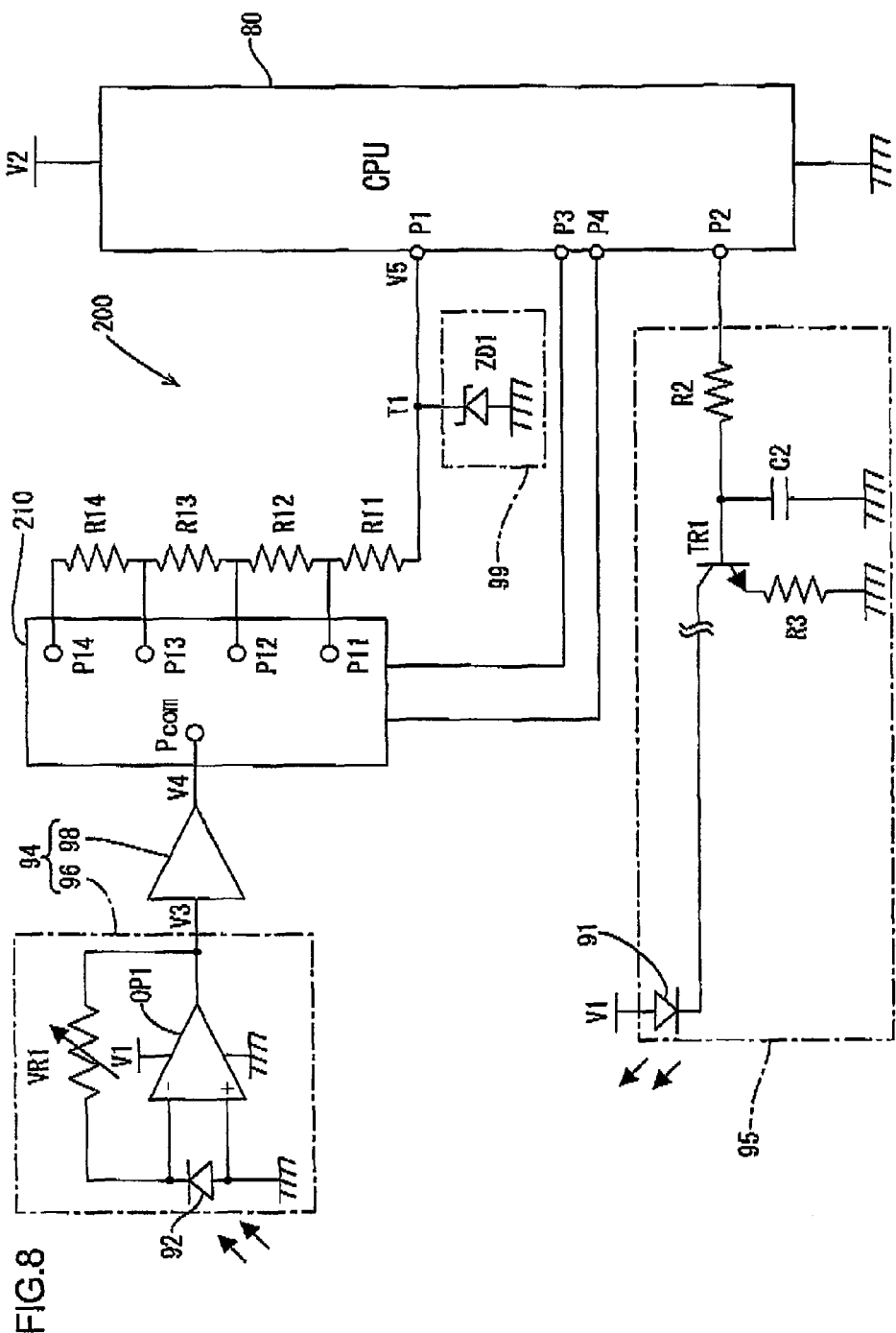
FIG. 8 is a circuit diagram schematically illustrating the configuration of connection among a density sensor, a current regulating circuit, and a CPU of a light amount measuring device according to another illustrative aspect.

Another illustrative aspect of the present invention will be described with reference to FIG. 8. FIG. 8 is a circuit diagram schematically illustrating the configuration of connection among a density sensor, a current regulating circuit, and a CPU of a light amount measuring device according to the present illustrative aspect. Note that the present illustrative aspect is used in the image forming apparatus 1 similar to that of the above-described illustrative aspect and is similar to the illustrative aspect except that resistors R11 to R14 and a multiplexer 210 are provided instead of the resistor R1 of the above-described illustrative aspect. Accordingly, similar components to those in the above-described illustrative aspect are denoted by the same reference numerals, a detailed description thereof will be omitted, and a description will be given with a focus on different components. Note that an amplifying circuit 98 in FIG. 8 is a non-inverting amplifying circuit of the same type as that in FIG. 4, and a detailed illustration thereof is omitted in FIG. 8.

A light amount measuring device 200 of the present illustrative aspect has the multiplexer 210 (an example of a switching portion) provided therein, which switches a characteristic of how a voltage input to a CPU 80 (an example of an A/D converting portion) is switched between a plurality of characteristics. The multiplexer 210 is configured as a known analog multiplexer. In accordance with control signals from terminals P3 and P4 of the CPU 80, one of terminals P11 to P14 is selected as a terminal to be connected to a common terminal Pcom. For example, if the terminal P11 is selected, the resistor R11 intervenes between the amplifying circuit 98 and the CPU 80.

If the terminal P14 is selected, the resistors $R_1$, $R_2$, $R_3$ and $R_4$ intervene between the amplifying circuit 98 and the CPU 80. With this configuration, the lowering characteristic can be switched between four characteristics. If the total resistance of the resistor (resistors) intervening between the amplifying circuit 98 and the CPU 80 increases, a voltage drop corresponding to a breakdown current in a zener diode ZD1 increases, and the increased effect of lowering the voltage input to the CPU 80 is obtained (a lowered amount is large). On the other hand, if the total resistance of the resistor (resistors) intervening between the amplifying circuit 98 and the CPU 80 is small, a voltage drop corresponding to a breakdown current in the zener diode ZD1 is small, and the reduced lowering effect is obtained (the lowered amount is small).

According to the configuration of the present illustrative aspect, it is possible to use light-receiving sensors with various output ranges, i.e., select a lowering characteristic according to the output range of the light-receiving sensor 94. Accordingly, more appropriate lowering can be performed. More specifically, it is possible to suitably deal with, e.g., a case where a light-receiving sensor is replaced with another or a case where the output range changes due to a secular change or the like.

Figure 9:
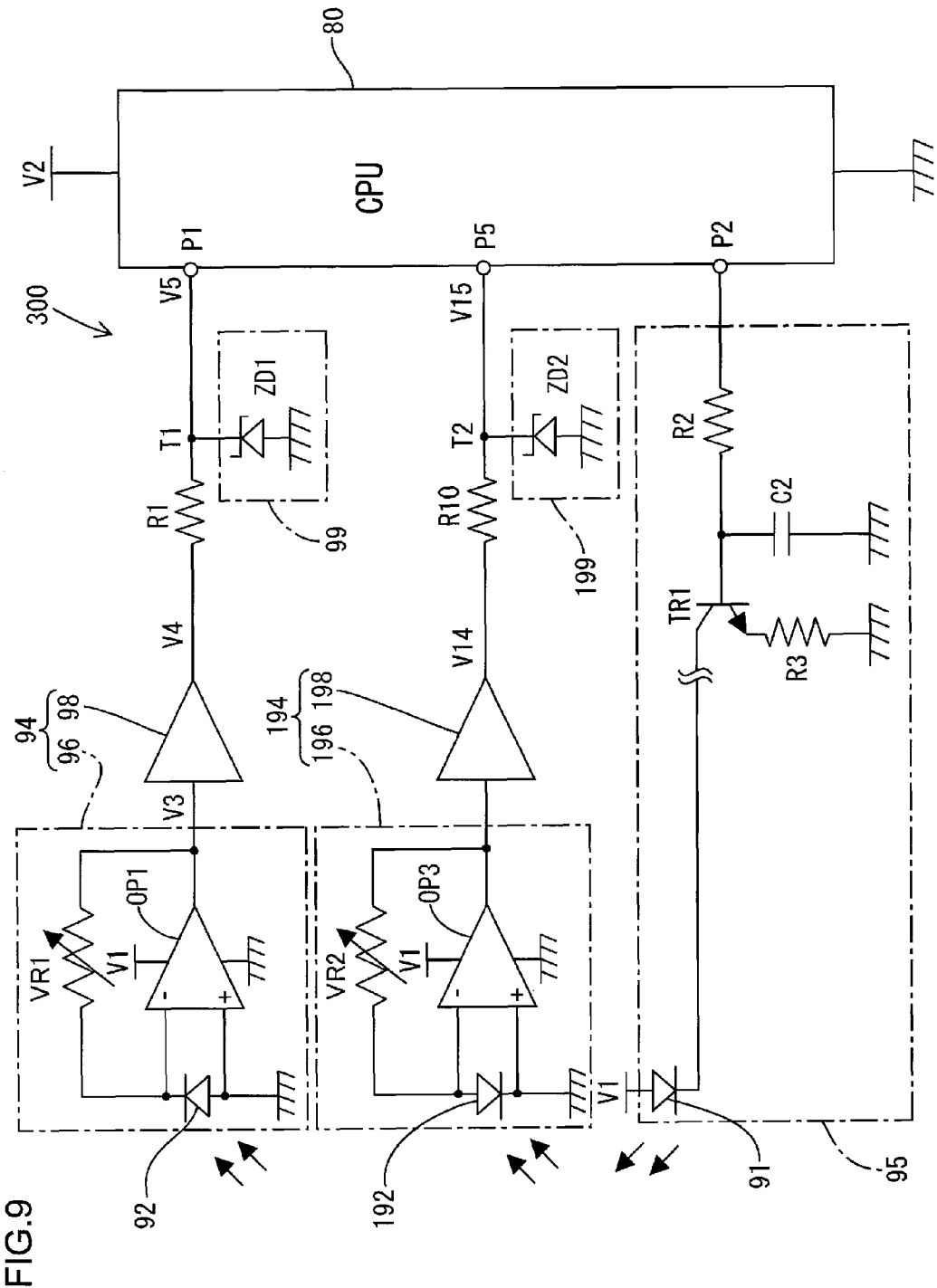
FIG. 9 is a circuit diagram schematically illustrating the configuration of connection among a density sensor, a current regulating circuit, and a CPU of a light amount measuring device according to still another illustrative aspect.

Still another illustrative aspect of the present invention will be described with reference to FIG. 9. FIG. 9 is a circuit diagram schematically illustrating the configuration of connection among a density sensor, a current regulating circuit, and a CPU of a light amount measuring device according to the present illustrative aspect.

A light amount measuring device 300 of the present illustrative aspect is used in the image forming apparatus 1 similar to that of the illustrative aspect shown in FIG. 1. The present illustrative aspect is similar to the illustrative aspect shown in FIG. 1 except that a light-receiving sensor 194, a resistor R10, and a current regulating circuit 199 are added and that the amount of reflected light from a black density patch is calculated on the basis of light reception by a light-receiving sensor 94, and the amount of reflected light from a density patch of a color other than black is calculated on the basis of light reception by the light-receiving sensor 194 (i.e., the process of S40 in FIG. 7). Accordingly, similar components are denoted by the same reference numerals, and a detailed description thereof will be omitted.

In the present illustrative aspect, the light-receiving sensor 194, which receives diffusely reflected light, is provided in addition to the above-described light-receiving sensor 94, which receives specularly reflected light. The light-receiving sensor 194 is similar to the light-receiving sensor 94 except for the arrangement and circuit constant (note that the circuit constant may be equal to that of the light-receiving sensor 94). Resistor R10 is connected between the light-receiving sensor 194 and a CPU 80 corresponding to an example of an A/D converting portion. The current regulating circuit 199 (similar to a current regulating circuit 99) is connected between the resistor R10 and a terminal P5 of the CPU 80. The current regulating circuit 199 is composed of a zener diode ZD2 which has similar characteristics to (for example, the same characteristics as) those of a zener diode ZD1 and has one end connected between the CPU 80 and the resistor R10. The current regulating circuit 199 has a function of letting a breakdown current flow therethrough and increasing the amount of current which is drawn in through the one end if an output voltage V14 from the light-receiving sensor 194 is not less than a predetermined threshold. That is, an input voltage to the terminal P5 is also subjected to lowering similar to that for an input voltage to a terminal P1.

Note that light amount measurement based on light reception by the light-receiving sensor 194 is similar to the above-described light amount measurement (see FIG. 7 and the like). Also note that light amount measurement of the present illustrative aspect is different from that of the above-described illustrative aspects in that the light amount measurement based on light reception by the light-receiving sensor 94 is performed only for a black density patch, and the light amount measurement based on light reception by the light-receiving sensor 194 is performed for the colors other than black (yellow, magenta, and cyan).

Figure 11:
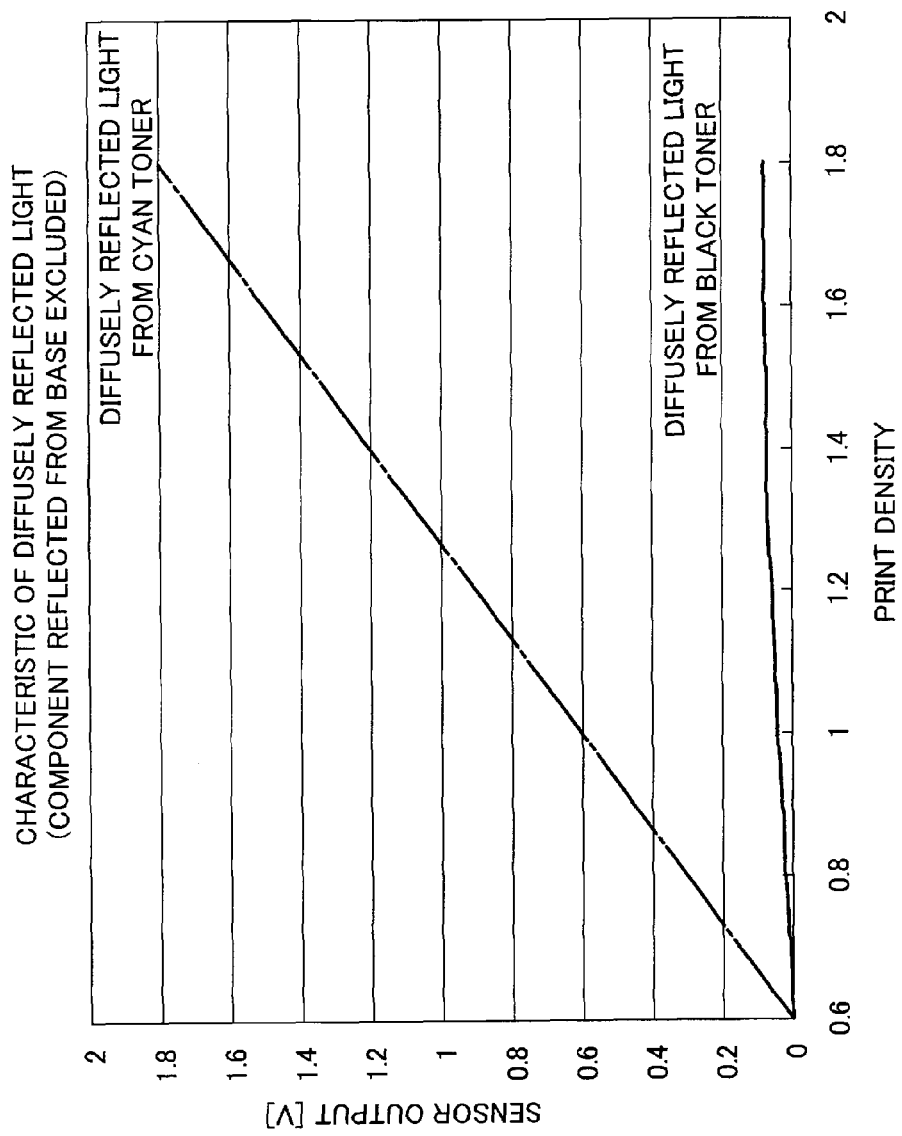
FIG. 11 is a graph illustrating the characteristics of diffusely reflected light beams.

Yellow, magenta, and cyan toners generally have the property of diffusely reflecting infrared light. When the amount of adherent toner increases, some of diffusely reflected components from the toner may be mixed into the light-receiving sensor 94 (see the characteristic of cyan in FIG. 10). For this reason, the light-receiving sensor 194, which receives only diffuse reflection, is provided to be used for yellow, magenta, and cyan. If diffusely reflected light of each of yellow, magenta, and cyan (the diffusely reflected light of cyan toner is illustrated in FIG. 11) is detected by the light-receiving sensor 194, the detection result exhibits the property that a sensor output stably and largely increases with an increase in print density, and the sensor output and the print density satisfactorily correspond one-to-one to each other, as shown in FIG. 11. Accordingly, as for yellow, magenta, and cyan toners, such density detection based on the amount of diffusely reflected light allows higher-accuracy density measurement. Note that since black toner hardly diffusely reflects light (see FIG. 11), it is preferable to perform density detection by the same method as in the above-described illustrative aspects using the specular reflection light-receiving sensor 94.

Note that the difference between the amount of light received from a base and the amount of light received from a patch of each of yellow, magenta, and cyan is used without any change to obtain the density of the patch of the color by receiving diffusely reflected light. That is, a subtraction of the amount of light at the time of base measurement (Vb) from the amount of light at the time of density patch measurement (Vp) is performed, and a toner density is calculated using the correlation between the difference and the amount of adherent toner obtained in advance for each color.

In the above-described illustrative aspects, the A/D converting portion is realized by the CPU 80. However, the A/D converting portion can be configured using an A/D converter different from the CPU 80 in any of the illustrative aspects. For example, in the case of the configuration in FIG. 4 or 8, an A/D converter which receives the second applied voltage V2 from the second power supply circuit 120 may be arranged between the connection point T1 and the terminal P1 and configured such that the above-described input voltage V5 is input thereto, and the CPU 80 may calculate the amount of light and a density on the basis of a digital value into which the input voltage V5 is converted by the A/D converter. In the case of the configuration in FIG. 9, it suffices to arrange a similar A/D converter both between a connection point T1 and the terminal P1 and between a connection point T2 and the terminal P5.

In the illustrative aspects, a voltage output is obtained by using a photodiode, an operational amplifier, and the like in the light-receiving portion 96. However, a phototransistor, a photodarlington, and the like may be used instead.

The illustrative aspects have each illustrated the light-receiving sensor 94, in which the amplifying circuit 98 is provided at the subsequent stage of the light-receiving portion 96. However, the amplifying circuit 98 at the subsequent stage of the light-receiving portion 96 may be absent (for example, the voltage V3 may be applied from the light-receiving portion 96 to the resistor R1).

The illustrative aspect shown in FIG. 9 has illustrated a configuration having two lowering portions (i.e., the zener diodes ZD1 and ZD2) provided therein. The level of a sensor output (the output V14 from the light-receiving sensor 194) tends to be lower on the side where diffusely reflected light is detected than on the side where specularly reflected light is detected. Accordingly, the lowering portion may be omitted on the side where diffusely reflected light is detected. For example, the zener diode ZD2 may be omitted from the configuration in FIG. 9.

Note that the light amount calculating portion, which calculates the amount of light incident on a light-receiving sensor, may calculate the amount of light itself or a value of some type from which the amount of light can be determined.

The "correction information" stored in the storage portion may be an approximate expression which defines the relationship between an input voltage and the amount of light on the basis of a characteristic of how an input voltage is lowered by the lowering portion or a table having an input voltage and the amount of light associated with each other on the basis of the characteristic of how an input voltage is lowered by the lowering portion.

What is claimed is:

1. A light amount measuring device configured to be used to in an image forming device where the light amount measuring device receives light reflected from an image with a density patch and the image forming device adjusts a density of toner based on the light detected by the light amount measuring device, the light amount measuring device comprising:
   a light-receiving sensor having an output terminal and capable of outputting a voltage corresponding to an amount of incident light from the output terminal, the light-receiving sensor being located to receive light reflected from the density patch;
   an A/D converting portion having an input terminal and capable of converting an input voltage input from the input terminal into a digital value;
   a light amount calculating portion capable of calculating the amount of light incident on the light-receiving sensor on the basis of the digital value obtained by conversion by the A/D converting portion;
   a resistor connected between the A/D converting portion and the light-receiving sensor, one end of the resistor being connected to the input terminal of the A/D converting portion and another end of the resistor being connected to the output terminal of the light receiving sensor; and
   a zener diode having one end connected between the input terminal of the A/D converting portion and the resistor, wherein the zener diode is capable of allowing a breakdown current flow from the one end to another end if an output voltage from the light-receiving sensor is not less than a predetermined value.

2. The light amount measuring device according to claim 1, further comprising
   a storage portion capable of storing correction information based on a characteristic of how the input voltage to the A/D converting portion is lowered by the zener diode, wherein
   the light amount calculating portion is capable of calculating the amount of light on the basis of a digital value into which the A/D converting portion converts a voltage lowered by the zener diode and the correction information.

3. The light amount measuring device according to claim 1, wherein
   the zener diode is capable of allowing the breakdown current to flow therethrough, further wherein the breakdown current is mainly composed of a current caused by a tunnel effect.

4. The light amount measuring device according to claim 1, comprising
   a switching portion capable of switching a characteristic of how the voltage input to the A/D converting portion is switched between a plurality of characteristics.

5. The light amount measuring device according to claim 1, wherein
   the light-receiving sensor is supplied with voltage from a first power supply,
   the A/D converting portion is supplied with voltage from a second power supply, and
   a second applied voltage from the second power supply to the A/D converting portion is set to be lower than a first applied voltage from the first power supply to the light-receiving sensor.

6. The light amount measuring device according to claim 5, wherein the predetermined value is lower than the second applied voltage.

7. The light amount measuring device according to claim 1, wherein
   the light-receiving sensor is capable of receiving reflected light from a black toner image, and
   the light amount calculating portion calculates an amount of the reflected light incident on the light-receiving sensor from the black toner image.

8. A light amount measuring device configured to be used to in an image forming device where the light amount measuring device receives light reflected from an image with a density patch and the image forming device adjusts a density of toner based on the light detected by the light amount measuring device, the light amount measuring device comprising:
   a light-receiving sensor having an output terminal and configured to output a voltage corresponding to an amount of incident light from the output terminal, the light-receiving sensor being located to receive light reflected from the density patch;
   an A/D converting portion having an input terminal and configured to convert an input voltage input from the input terminal into a digital value;
   a light amount calculating portion configured to calculate the amount of light incident on the light-receiving sensor on the basis of the digital value obtained by conversion by the A/D converting portion;
   a resistor connected between the A/D converting portion and the light-receiving sensor, one end of the resistor being connected to the input terminal of the A/D converting portion and another end of the resistor being connected to the output terminal of the light receiving sensor; and
   a lowering portion configured to lower a tendency for the input voltage to the input terminal of the A/D converting portion to increase with an increase in the amount of light incident on the light-receiving sensor if an output voltage from the light-receiving sensor is not less than a predetermined value.

9. The light amount measuring device according to claim 8, comprising
   a storage portion configured to store correction information based on a characteristic of how a voltage is lowered by the lowering portion, wherein
   the light amount calculating portion configured to calculate the amount of light on the basis of a digital value into which the A/D converting portion converts a voltage lowered by the lowering portion and the correction information.

10. The light amount measuring device according to claim 8, wherein the lowering portion includes a current regulating circuit which has one end connected between the A/D converting portion and the resistor, further wherein the current regulating circuit is configured to increase an amount of current which is drawn in through the one end if the output voltage from the light-receiving sensor is not less than the predetermined value.

11. The light amount measuring device according to claim 10, wherein the current regulating circuit has a zener diode configured to allow a breakdown current flow from the one end to the other end if the output voltage from the light-receiving sensor is not less than the predetermined value.

12. An image forming apparatus comprising:
a forming portion configured to form an image based on print data and a density patch;
an irradiating portion configured to irradiate the density patch with light;
a light amount measuring device configured to receive reflected light from the density patch and measure an amount of the reflected light;
a regulating portion configured to regulate a density of the image based on the print data, on the basis of a result of measuring the amount of the light from the density patch; and
wherein, the light amount measuring device includes,
  a light-receiving sensor having an output terminal and capable of outputting a voltage corresponding to an amount of incident from the output terminal:
  an A/D converting portion having an input terminal and capable of converting an input voltage input from the input terminal into a digital value;
  a light amount calculating portion capable of calculating the amount of light incident on the light-receiving sensor on the basis of the digital value obtained by conversion by the A/D converting portion;
  a resistor connected between the A/D converting portion and the light-receiving sensor, one end of the resistor being connected to the input terminal of the A/D converting portion and another end of the resistor being connected to the output terminal of the light receiving sensor; and
  a zener diode having one end connected between the input terminal of the A/D converting portion and the resistor, wherein the zener diode is capable of allowing a breakdown current flow from the one end to another end if an output voltage from the light-receiving sensor is not less than a predetermined value.

13. A toner density measuring apparatus comprising:
an irradiating portion configured to irradiate a toner image formed by a forming portion provided in an image forming apparatus;
a light amount measuring device configured to receive reflected light from the toner image and measure an amount of the reflected light; and
wherein, the light amount measuring device includes,
  a light-receiving sensor having an output terminal and capable of outputting a voltage corresponding to an amount of incident light from the output terminal;
  an A/D converting portion having an input terminal and capable of converting an input voltage input from the input terminal into a digital value;
  a light amount calculating portion capable of calculating the amount of light incident on the light-receiving sensor on the basis of the digital value obtained by conversion by the A/D converting portion;
  a resistor connected between the A/D converting portion and the light-receiving sensor, one end of the resistor being connected to the input terminal of the A/D converting portion and another end of the resistor being connected to the output terminal of the light receiving sensor; and
  a zener diode having one end connected between the input terminal of the A/D converting portion and the resistor, wherein the zener diode is capable of allowing a breakdown current flow from the one end to another end if an output voltage from the light-receiving sensor is not less than a predetermined value.

14. A light amount measuring device comprising:
a light-receiving sensor having an output terminal and capable of outputting a voltage corresponding to an amount of incident light from the output terminal;
an A/D converting portion having an input terminal and capable of converting an input voltage input from the input terminal into a digital value;
a light amount calculating portion capable of calculating the amount of light incident on the light-receiving sensor on the basis of the digital value obtained by conversion by the A/D converting portion;
a resistor connected between the A/D converting portion and the light-receiving sensor, one end of the resistor being connected to the input terminal of the A/D converting portion and another end of the resistor being connected to the output terminal of the light receiving sensor;
a zener diode having one end connected between the input terminal of the A/D converting portion and the resistor, wherein the zener diode is capable of allowing a breakdown current flow from the one end to another end if an output voltage from the light-receiving sensor is not less than a predetermined value; and
a storage portion capable of storing correction information based on a characteristic of how the input voltage to the A/D converting portion is lowered by the zener diode,
wherein the light amount calculating portion is capable of calculating the amount of light on the basis of a digital value into which the A/D converting portion converts a voltage lowered by the zener diode and the correction information.

15. A light amount measuring device comprising:
a light-receiving sensor having an output terminal and configured to output a voltage corresponding to an amount of incident light from the output terminal;
an A/D converting portion having an input terminal and configured to convert an input voltage input from the input terminal into a digital value;
a light amount calculating portion configured to calculate the amount of light incident on the light-receiving sensor on the basis of the digital value obtained by conversion by the A/D converting portion;
a resistor connected between the A/D converting portion and the light-receiving sensor, one end of the resistor being connected to the input terminal of the A/D converting portion and another end of the resistor being connected to the output terminal of the light receiving sensor;
a lowering portion configured to lower a tendency for the input voltage to the input terminal of the A/D converting portion to increase with an increase in the amount of light incident on the light-receiving sensor if an output voltage from the light-receiving sensor is not less than a predetermined value; and
a storage portion configured to store correction information based on a characteristic of how a voltage is lowered by the lowering portion,
wherein the light amount calculating portion configured to calculate the amount of light on the basis of a digital value into which the A/D converting portion converts a voltage lowered by the lowering portion and the correction information.

* * * * *